United States Patent
Chung (10) Patent No.: US 6,924,855 B2
(45) Date of Patent: Aug. 2, 2005

(54) DISPLAYING APPARATUS WITH FLAT PANEL

(75) Inventor: Kyu-Hwang Chung, Seongnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 173 days.

(21) Appl. No.: 09/840,084

(22) Filed: Apr. 24, 2001

(65) Prior Publication Data

US 2002/0084995 A1 Jul. 4, 2002

(30) Foreign Application Priority Data

Jan. 4, 2001 (KR) .......................................... 2001-293

(51) Int. Cl.⁷ .......................................... G02F 1/1333
(52) U.S. Cl. ....................... 349/58; 349/149; 439/98; 439/497; 439/494; 439/495
(58) Field of Search .................. 349/58, 149–152; 439/98, 497, 494, 495

(56) References Cited

U.S. PATENT DOCUMENTS

| | | | |
|---|---|---|---|
| 5,138,565 A | | 8/1992 | Satou |
| 5,176,538 A | * | 1/1993 | Hansell, III et al. ........ 439/607 |
| 5,796,578 A | | 8/1998 | Jones |
| 5,986,737 A | | 11/1999 | Evanicky et al. |
| 6,053,770 A | * | 4/2000 | Blom .......................... 439/579 |
| 6,175,396 B1 | | 1/2001 | Kim et al. |
| 6,305,971 B1 | * | 10/2001 | Yu-Feng ..................... 439/493 |

FOREIGN PATENT DOCUMENTS

| | | |
|---|---|---|
| JP | 6-37478 | 2/1994 |
| JP | 07-128680 | 5/1995 |
| JP | 08-22026 | 1/1996 |
| JP | 9-146109 | 6/1997 |
| JP | 10-10565 | 1/1998 |
| JP | 10-74550 | 3/1998 |
| JP | 10-177881 | 6/1998 |
| JP | 10-340759 | 12/1998 |
| JP | 11-284291 | 10/1999 |
| JP | 11-352509 | 12/1999 |

OTHER PUBLICATIONS

Japanese Office Action issued in Applicant's corresponding Japanese Patent Application No. 2001-116791 (dated Feb. 10, 2004).

* cited by examiner

Primary Examiner—Robert H. Kim
Assistant Examiner—Thoi V. Duong
(74) Attorney, Agent, or Firm—Robert E. Bushnell, Esq.

(57) ABSTRACT

A flat panel displaying apparatus is disclosed. The flat panel displaying apparatus includes a liquid crystal display module displaying a picture, a chassis surrounding edges of the liquid crystal display module, defining an external appearance of the flat panel displaying apparatus, a printed circuit board provided with a connector connected to an external system by a connection cable, being grounded to the chassis, a liquid crystal display controller provided in the printed circuit board, activating the liquid crystal display module, and a ground portion formed around the liquid crystal display controller. With this configuration, emission of electromagnetic waves of the printed circuit board is minimized and reliability of the product is enhanced.

21 Claims, 7 Drawing Sheets

DISPLAYING APPARATUS WITH FLAT PANEL

CLAIM OF PRIORITY

This application makes reference to, incorporates the same herein, and claims all benefits accruing under 35 U.S.C. §119 from an application entitled Flat Panel Display earlier filed in the Korean Industrial Property Office on 4 Jan. 2001, and there duly assigned Serial No. 2001-293 by that Office.

BACKGROUND OF THE INVENTION

1. Field of the Invention

The present invention relates in general to a displaying apparatus with a flat panel, and more particularly, to a displaying apparatus with a flat panel having a ground structure of a printed circuit board (PCB) being improved.

2. Description of the Background Art

A flat panel displaying apparatus generally includes a front cover having a central opening, a rear cover closely coupled to the front cover, and a liquid crystal display (LCD) panel provided between the front cover and the rear cover, being connected to an external system so as to display a picture.

A liquid crystal display panel includes a plate-shaped liquid crystal display module displaying a picture outwardly, and a chassis defining an external appearance of the displaying apparatus. On the lower part of the liquid crystal display module, there is provided a lamp illuminating the liquid crystal display module. To the rear of the liquid crystal display module, there is mounted a printed circuit board driving the liquid crystal display module.

The printed circuit board is constructed by stacking a plurality of substrates formed with circuits in layers. In a lower edge of the printed circuit board, there is provided a connector coupled to a connection cable allowing the connector to be connected to an external system. A liquid crystal display controller is connected to the connector, so as to activate the liquid crystal display module according to signals inputted from the external system. In the upper edge portion of the printed circuit board are provided a plurality of driver integrated circuits (IC), converting the digital signals from the liquid crystal display controller into analog signals so as to display a picture on the liquid crystal display module. The driver integrated circuits are assembled to the liquid crystal display module. The liquid crystal display controller and the driver integrated circuits are connected together by a plurality of signal lines provided in the printed circuit board. The signal lines transmit the digital signals from the liquid crystal display controller to the respective driver integrated circuits.

Recently, there is a growing tendency to miniaturize flat panel displaying apparatus in weight and dimension. To comply with this tendency, the printed circuit board has been steadily decreasing in size. As the size of the printed circuit board becomes small in comparison to the number of the signal lines interconnecting the liquid crystal display controller and the driver integrated circuits, the ground portions of the printed circuit board are dispersed. The ground portions formed on the respective substrates are interconnected through holes.

Some of the ground portions of the printed circuit board are connected to a pair of conductor plates that are coupled to opposite sides of the chassis by screws, thereby allowing the printed circuit board to be grounded to the chassis.

In the earlier flat panel displaying apparatus, only some of the ground portions of the printed circuit board are coupled to the sides of the chassis, in view of the structure of the printed circuit board. However, because no ground portion is formed around the liquid crystal display controller, the place that emits electromagnetic waves the most intensely over the flat panel displaying apparatus, emission of the electromagnetic waves increases. As a result, the digital signals transferred through the signal lines between the liquid crystal display controller and the driver integrated circuits become unstable due to the electromagnetic waves, thereby lowering a reliability of the product.

Exemplars of the art are U.S. Pat. No. 6,175,396 B1 by Kim et al., for Liquid Crystal Display Module, U.S. Pat. No. 5,986,737 by Evanicky et al., for Multi-layer Flat Panel Display Screen Apparatus, U.S. Pat. No. 5,796,578 by Jones, for RF Grounding And Heat Distribution System for a Portable Computer Including a Slip Joint Hinge with a Banana Plug Type Male Intrusion Member, U.S. Pat. No. 5,138,565 by Satou, for Shielded Electronic Apparatus Having a Removable Shielded Display, Japanese Patent No. 6-37478 by Kubo et al., for Driving Apparatus for Liquid Crystal, Japanese Patent No. 9-146109 by Iwami, for Liquid Crystal Display Device, Japanese Patent No. 10-10565 by Yamashita, for Liquid Crystal Display Device And Electronic Equipment, Japanese Patent No. 10-74550 by Watanabe, for Equipment with Connector And Liquid Crystal Display Device, Japanese Patent No. 10-177881 by Page Jr., for HF Noise Screened Electric Connector Arrangement e.g. for Medical/Surgical Video Camera, Japanese Patent No. 10-340759 by Leonard et al., for Shielded Electrical Connector, and Japanese Patent No. 11-284291 by Tashiro, for Circuit Board And Liquid Crystal Display Device with the Circuit Board Mounted.

SUMMARY OF THE INVENTION

It is therefore an object of the present invention to provide a flat panel displaying apparatus minimizing emission of the electromagnetic waves and enhancing the reliability of the product.

It is another object to properly ground the printed circuit board of a flat panel displaying apparatus to reduce electromagnetic waves.

It is yet another object to provide a display apparatus that does not have to compensate for internal electromagnetic interference.

It is still yet another object to have a display apparatus that reduces the electromagnetic wave emissions at the connection point between the display apparatus and a connection cable to an external system.

These and other objects are provided, according to the present invention, by a flat panel displaying apparatus including a liquid crystal display module displaying a picture; a chassis surrounding edges of the liquid crystal display module, defining an external appearance of the flat panel displaying apparatus; a printed circuit board provided with a connector connected to an external system by a connection cable, being grounded to the chassis; a liquid crystal display controller provided in the printed circuit board, activating the liquid crystal display module; a ground portion formed around the liquid crystal display controller; and a reinforcement connection connected to the ground portion, supporting the ground of the printed circuit board.

The reinforcement connector is connected to the connection cable. The reinforcement connector includes a connector body formed with a housing portion housing the connection cable therein; a cover provided in the connector body, opening and closing the housing portion, to fasten the connection cable in the housing portion; and a ground contact provided in the housing portion of the connector body, being connected to the connection cable and the ground portion of the printed circuit board.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
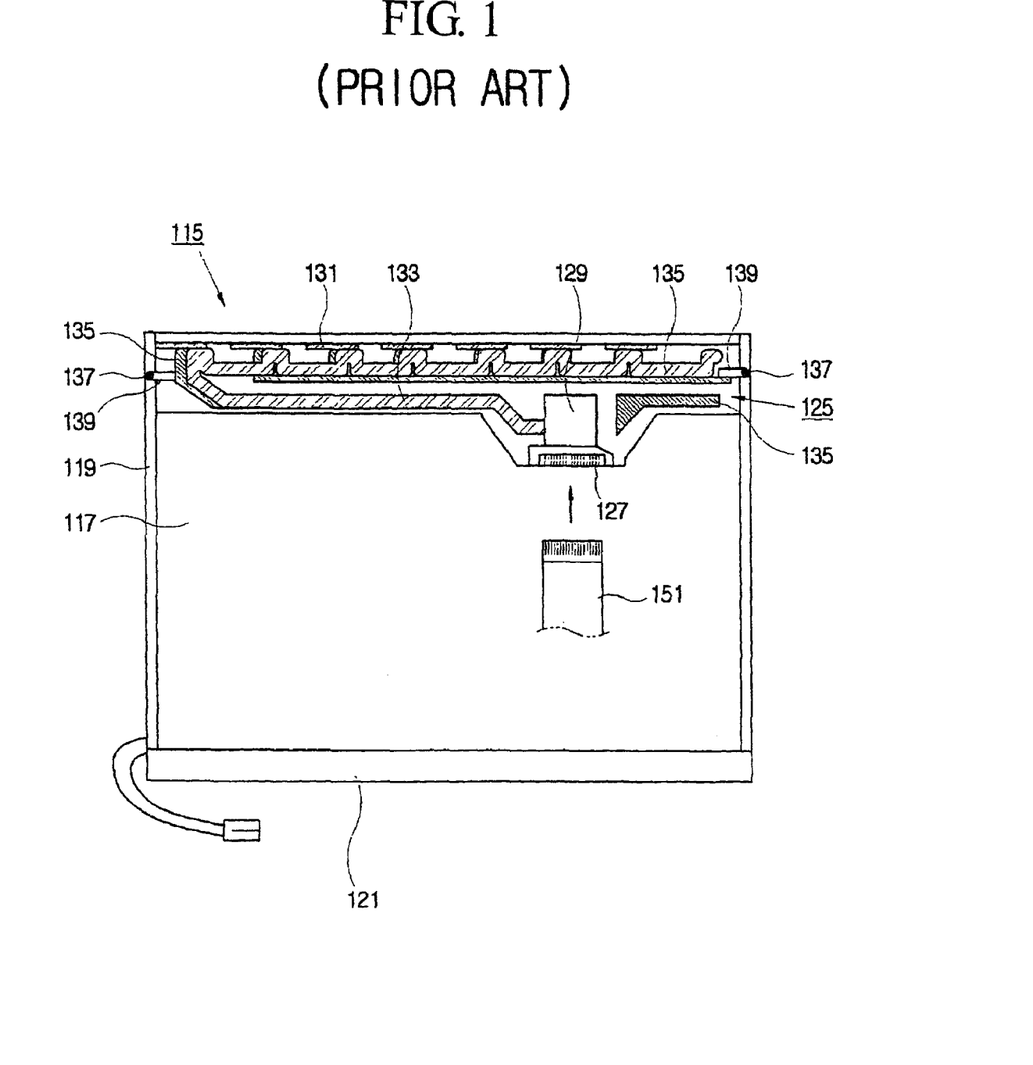
FIG. 1 is a rear plan view of an earlier liquid crystal display panel.

Turning now to the drawings, referring to FIG. 1 which is a rear plan view of an earlier liquid crystal display panel, the liquid crystal display panel 115 includes a plate-shaped liquid crystal display module 117 displaying a picture outwardly, and a chassis 119 defining an external appearance of the displaying apparatus.

On the lower part of the liquid crystal display module 117, there is provided a lamp 121 illuminating the liquid crystal display module 117. To the rear of the liquid crystal display module 117 is mounted a printed circuit board 125 driving the liquid crystal display module 117.

The printed circuit board 125 is constructed by stacking a plurality of substrates formed with circuits in layers. In a lower edge of the printed circuit board 125, there is provided a connector 127 coupled to a connection cable 151 allowing the connector 127 to be connected to an external system. A liquid crystal display controller 129 is connected to the connector 127, so as to activate the liquid crystal display module 117 according to signals inputted from the external system. In the upper edge portion of the printed circuit board 125 are provided a plurality of driver integrated circuits (IC) 131, converting the digital signals from the liquid crystal display controller 129 into analog signals so as to display a picture on the liquid crystal display module 117. The driver integrated circuits 131 are assembled to the liquid crystal display module 117. The liquid crystal display controller 129 and the driver integrated circuits 131 are connected together by a plurality of signal lines 133 provided in the printed circuit board 125, and the signal lines 133 transmit the digital signals from the liquid crystal display controller 129 to the respective driver integrated circuits 131.

To comply with the tendency to miniaturize flat panel displaying apparatus in weight and dimension, the printed circuit board 125 has increasingly gotten smaller in dimension. As the size of the printed circuit board 125 becomes small in comparison to the number of the signal lines 133 interconnecting the liquid crystal display controller 129 and the driver integrated circuits 131, the ground portions 135 of the printed circuit board 125 are dispersed, as shown in FIG. 1. Although it has not been shown in FIG. 1, the ground portions 135 formed on the respective substrates are interconnected through holes.

Some of the ground portions 135 of the printed circuit board 125 are connected to a pair of conductor plates 139 coupled to opposite sides of the chassis 119 by screws 137, thereby allowing the printed circuit board 125 to be grounded to the chassis 119.

Herein below, a flat panel displaying apparatus having a liquid crystal display module as one embodiment of the present invention will be described in more detail, by way of example, with reference to accompanying drawings.

Figure 2A:
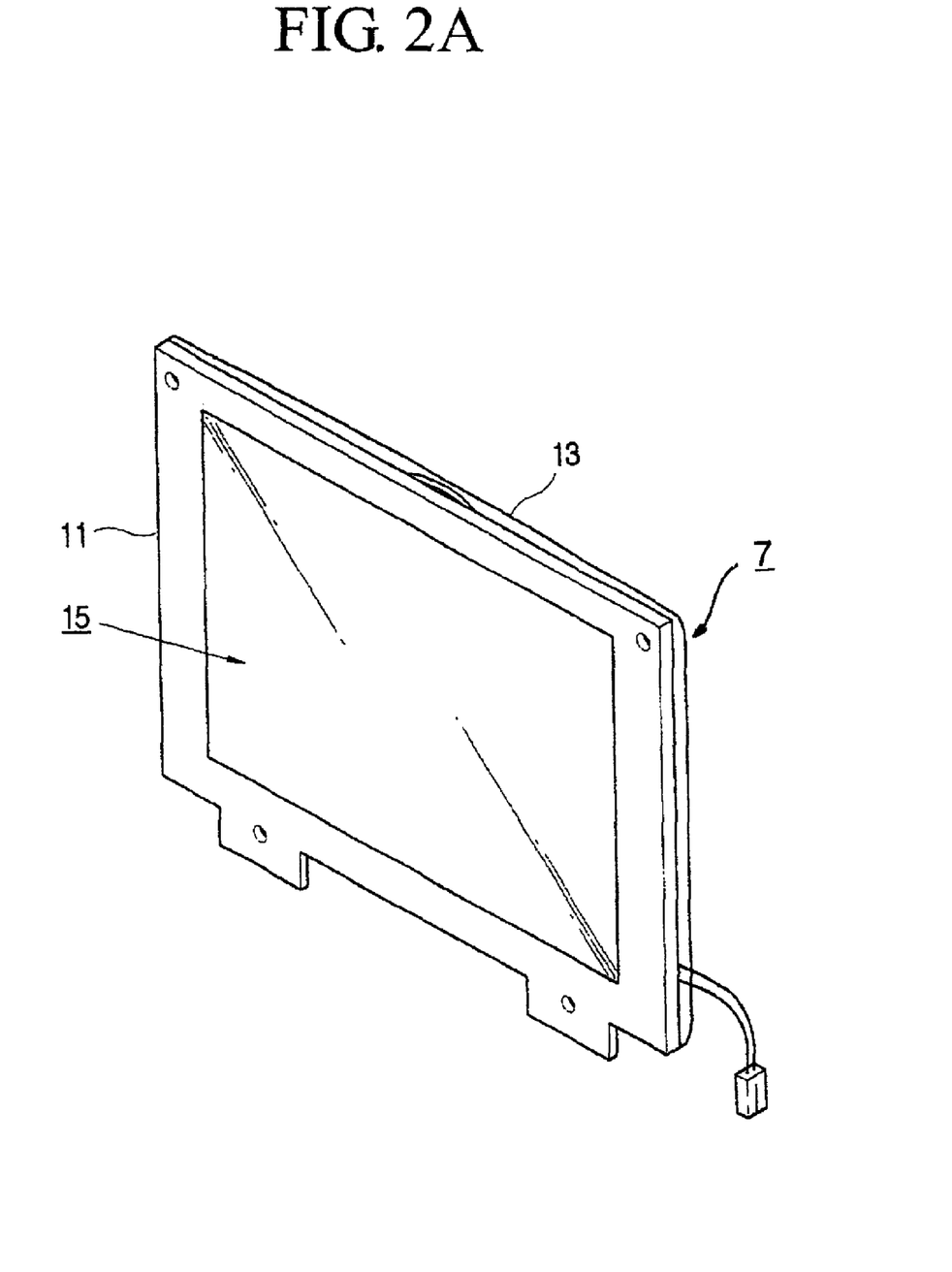
FIG. 2A is a perspective view of a flat panel displaying apparatus according to one embodiment of the present invention.
Figure 3:
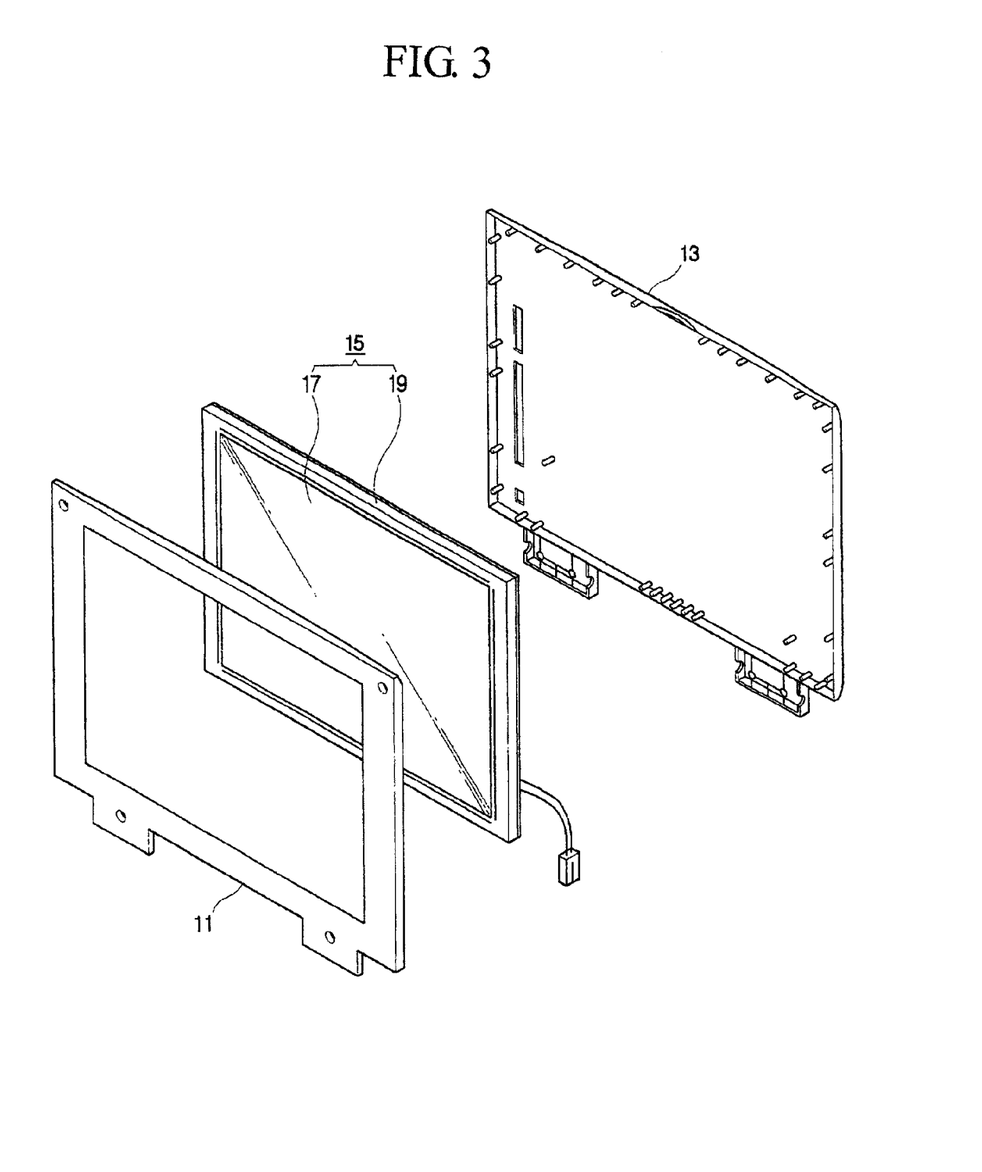
FIG. 3 is an exploded perspective view of FIG. 2A.

Referring to FIG. 2A which is a perspective view of a general flat panel displaying apparatus 7 according to one embodiment of the present invention and FIG. 3 which is an exploded perspective view of FIG. 2A, the flat panel displaying apparatus 7 includes a front cover 11 having a central opening, a rear cover 13 closely coupled to the front cover 11, and a liquid crystal display panel 15 provided between the front cover 11 and the rear cover 13, being connected to an external system 9 so as to display a picture.

The liquid crystal display panel 15 includes a plate-shaped liquid crystal display module 17 displaying a picture outwardly, and a chassis 19 surrounding edges of the liquid crystal display module 17, to thereby define an external appearance of the displaying apparatus 7.

Figure 4:
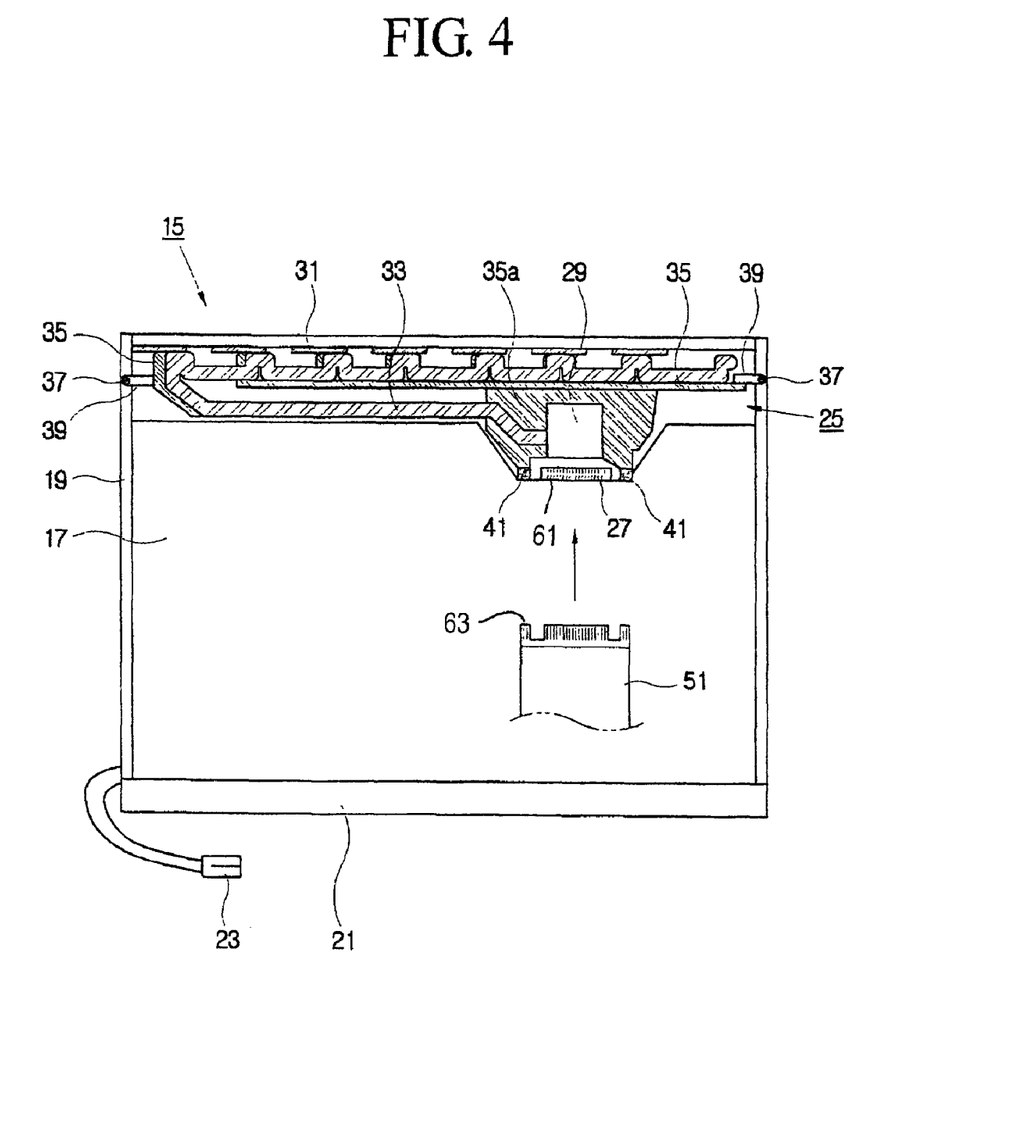
FIG. 4 is a rear plan view of a liquid crystal display panel of FIG. 3.

Referring now to FIG. 4, on the lower part of the liquid crystal display module 17, there is provided a lamp 21 illuminating the liquid crystal display module 17, having one end being connected to a lamp cable 23. To the rear of the liquid crystal display module 17, there is mounted a printed circuit board 25 driving the liquid crystal display module 17.

Figure 2B:
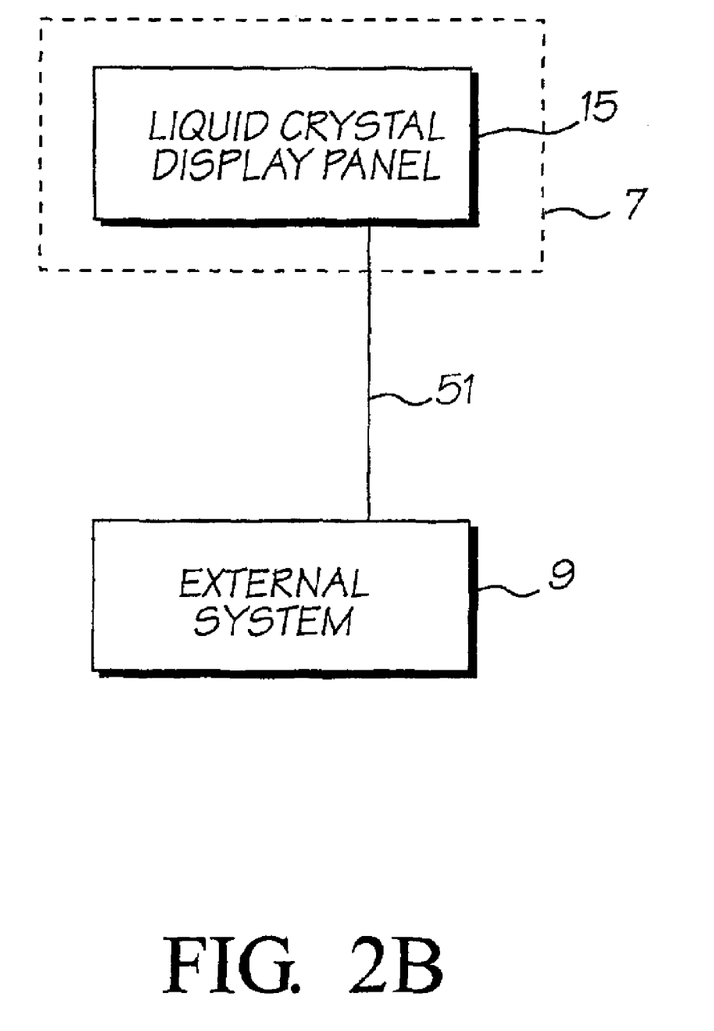
FIG. 2B is a diagram of the connection between the flat panel displaying apparatus of FIG. 2A and an external system.

In a lower part of the printed circuit board 25, there is provided a connector 27 connected to a connection cable 51, thereby being connected to the external system 9 such as a computer system, a video system, or any other type of system that will send a picture signal to the liquid crystal display module 17, as seen in FIGS. 2B and 4. A liquid crystal display controller 29 is connected to the connector 27, so as to activate the liquid crystal display module 17 in response to signals inputted from the external system 9. In the upper edge of the printed circuit board 25, there is provided a plurality of driver integrated circuits 31, converting the digital signals from the liquid crystal display controller 29 into analog signals so as to display a picture on the liquid crystal display module 17. The driver integrated circuits 31 are coupled to the liquid crystal display module 17. The liquid crystal display controller 29 and the driver integrated circuits 31 are connected together by a plurality of signal lines 33 provided in the printed circuit board 25, and the signal lines 33 transmit the digital signals from the liquid crystal display controller 29 to the respective driver integrated circuits 31.

Figure 5A:
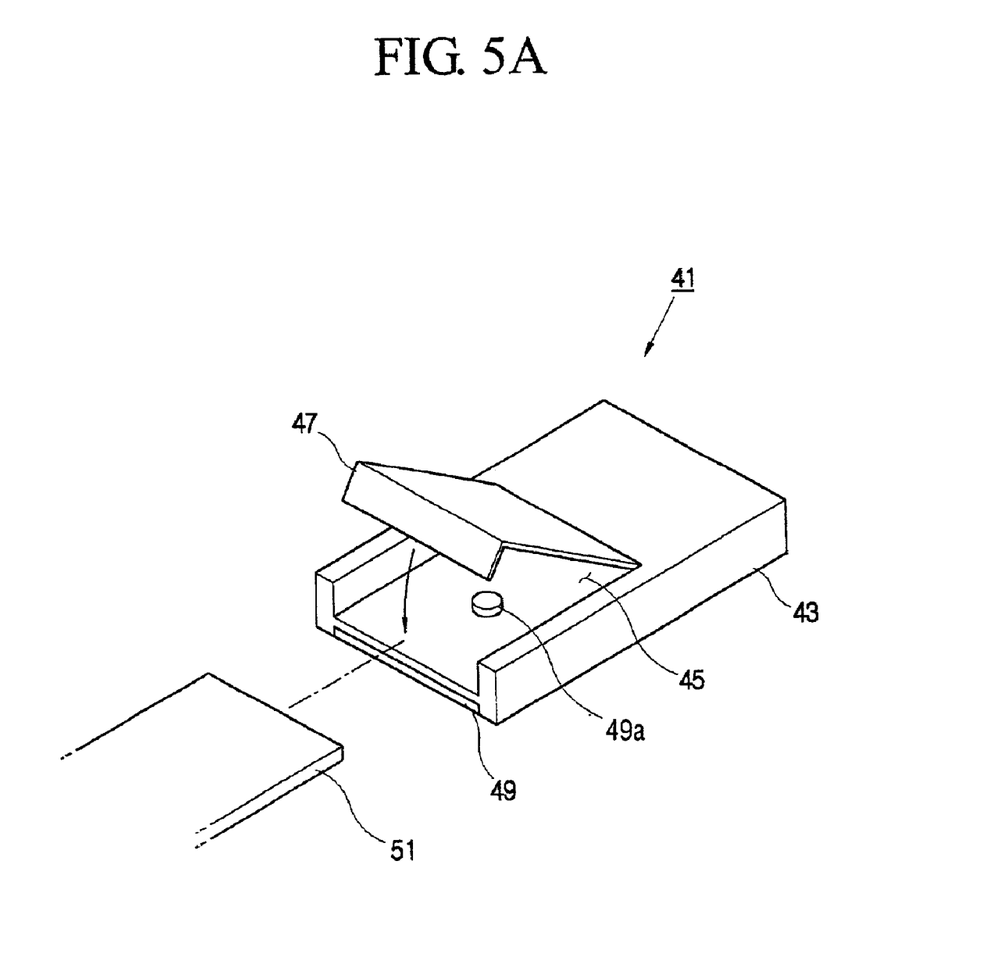
FIGS. 5A through 5C are schematic perspective views of a reinforcement connector shown in FIG. 4.
Figure 5B:
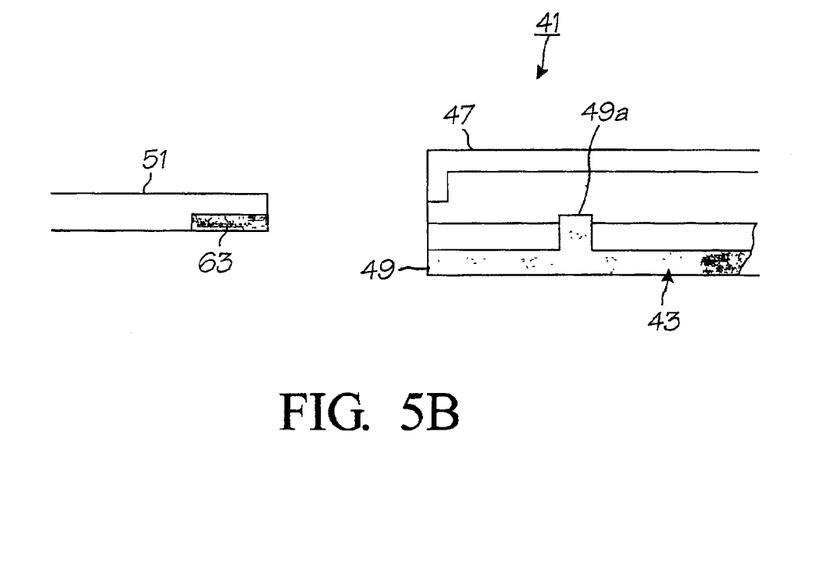
Figure 5C:
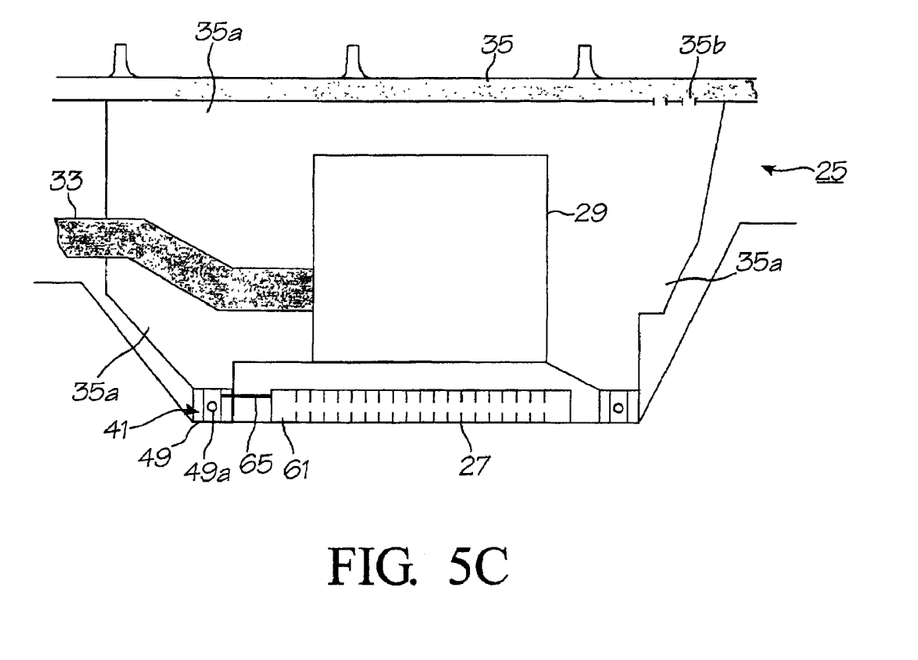

A plurality of ground portions 35 are formed adjacent to the signal lines 33 of the printed circuit board 25. The ground portions 35 are made of a suitable conductive material. Particularly, a controller ground portion 35a is formed around the liquid crystal display controller 29, surrounding the liquid crystal display controller 29. The controller ground portion 35a is made of a suitable conductive material. As seen in FIG. 5C, the ground portions 35 and 35a formed at respective boards are interconnected through holes 35b.

The controller ground portion 35a around the liquid crystal display controller 29 of the printed circuit board 25 is connected to a ground contact 49 (see FIG. 5C) of a reinforcement connector 41 to be described later, then being grounded to the connection cable 51 connected to the reinforcement connector 41. The ground contact 49 is made of a suitable conductive material. Some of the other ground portions 35 are connected to a pair of conductor plates 39 screw-coupled by a screw 37 at opposite sides of the chassis 19, thereby being grounded to the chassis 19. The conductor plates 39 are made of a suitable conductive material.

The pair of reinforcement connectors 41 supporting the ground of the printed circuit board 25 are provided near opposite sides of the connector 27. As depicted in FIG. 5A, the reinforcement connector 41 includes a connector body 43 formed with a housing portion 45 housing a ground pin 63 of the connection cable 51 therein and being opened upwardly, a cover 47 provided so as to open and close the opening of the housing portion 45 of the connector body 43 and fastening the connection cable 51 in the housing portion 43, and the ground contact 49 provided at the bottom of the housing portion 45, being connected by a connection 65 to the ground pin 61 of the connector 27 and the controller ground portion 35a formed around the liquid crystal display controller 29.

The ground contact 49 of the reinforcement connector 41 is connected to one side of the controller ground portion 35a around the liquid crystal display controller 29, e.g., by soldering. The ground contact 49 of the reinforcement connector 41 is also connected to a ground pin 61 of the connector 27, allowing the connector 27 to be grounded through the controller ground portion 35a around the liquid crystal display controller 29.

To connect the connection cable 51 to the reinforcement connector 41, the cover 47 is first moved upward so as to open the housing portion 45, through which the ground pin 63 of the connection cable 51 is inserted. The cover 47 is then moved downward so as to close the housing portion 45. As a result, the connection cable 51 is firmly housed in the housing portion 45, the connection cable 51 is engaged with the reinforcement connector 41, the ground pin 63 of the connection cable 51 within the housing portion 45 is connected to the ground contact 49 through a ground protrusion 49a of the ground contact 49, and finally the reinforcement connector 41 is connected to the controller ground portion 35a around the liquid crystal display controller 29.

With this configuration, the ground pin 63 of the connection cable 51 and the ground pin 61 of the connector 27 are connected to the controller ground portion 35a around the liquid crystal display controller via the ground contact 49 of the reinforcement connector 41. As described above, some of the ground portions 35 of the printed circuit board 25 are grounded to the chassis 19 by being connected to the conductor plates 39 screw-coupled by the screw 37 at the left and right sides of the chassis 19.

In view of the ground portion 35a around the liquid crystal display controller, which emits the most intense electromagnetic waves over the flat panel displaying apparatus 7, is connected to the connection cable 51, emission of the electromagnetic waves from the flat panel displaying apparatus 7 is minimized, and the digital signals from the liquid crystal display controller 29 can be transmitted to each of the driver integrated circuits 31 in a stable manner. Further, the reinforcement connector 41 connected to the ground portion 35a around the liquid crystal display controller 29 is provided, supporting the ground of the printed circuit board, to thereby strengthen the grounding effect of the flat panel displaying apparatus 7.

As described above, the flat panel displaying apparatus according to the present invention is capable of minimizing emission of electromagnetic waves of the printed circuit board and enhancing reliability of the product.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A flat panel displaying apparatus, comprising:
   a liquid crystal display module displaying a picture;
   a chassis surrounding edges of said liquid crystal display module, defining an external appearance of said flat panel displaying apparatus;
   a printed circuit board provided with a connector connected to an external system by a connection cable, said printed circuit board being grounded to said chassis;
   a liquid crystal display controller provided in said printed circuit board, said liquid crystal display controller activating said liquid crystal display module;
   a ground portion formed around said liquid crystal display controller; and
   a reinforcement connector connected to and formed with said ground portion and supporting the ground of said printed circuit board, with said reinforcement connector being detachably connected to said connection cable.

2. The flat panel displaying apparatus according to claim 1, further comprising a second ground portion formed adjacent to signal lines of said printed circuit board, said second ground portion being connected to said ground portion through a plurality of holes, said second ground portion being connected to said chassis.

3. The flat panel displaying apparatus according to claim 2, further comprising a second reinforcement connector detachably connected to said connection cable, said second reinforcement connector supporting a ground of said printed circuit board.

4. The flat panel displaying apparatus according to claim 3, with said reinforcement connector and said second reinforcement connector being formed on opposite sides of said connector detachably coupling with said connection cable, said connector receiving data signals from said external system to said printed circuit board.

5. The flat panel displaying apparatus according to claim 3, with said second reinforcement connector being detachably connected with said ground portion.

6. The flat panel displaying apparatus according to claim 1, with said connector having a ground pin connected with a ground contact of said reinforcement connector accommodating said connector to be grounded through said ground portion around said controller, said ground pin being detachably connected to a second ground pin of said connection cable.

7. The flat panel display apparatus according to claim 1, with said reinforcement connector being formed on said printed circuit board and not said connection cable, accommodating the detachable connection with said connection cable to said external system.

8. The flat panel display apparatus according to claim 1, with said reinforcement connector and said ground portion being integrally formed on said printed circuit board and not said connection cable, accommodating the detachable connection with said connection cable to said external system.

9. The flat panel displaying apparatus of claim 1, with said connector integrally formed on said printed circuit board, said connector detachably connected to said external system by said connection cable, and
   with said reinforcement connector connected to and integrally formed with said ground portion and said printed circuit board to accommodate the detachable connection to said connection cable.

10. A flat panel displaying apparatus, comprising:
   a liquid crystal display module displaying a picture;
   a chassis surrounding edges of said liquid crystal display module, defining an external appearance of said flat panel displaying apparatus;
   a printed circuit board provided with a connector connected to an external system by a connection cable, said printed circuit board being grounded to said chassis;

a liquid crystal display controller provided in said printed circuit board, said liquid crystal display controller activating said liquid crystal display module;

a ground portion formed around said liquid crystal display controller; and a reinforcement connector connected to said ground portion and supporting the ground of said printed circuit board, with said reinforcement connector being connected to said connection cable, with said reinforcement connector comprising:
- a connector body formed with a housing portion receiving said connection cable;
- a cover provided in said connector body, opening and closing said housing portion, to fasten said connection cable in said housing portion; and
- a ground contact provided in said housing portion of said connector body, said ground contact connected to said connection cable and said ground portion of said printed circuit board.

11. A displaying apparatus, comprising:

a chassis surrounding edges of a display module, defining an external appearance of said displaying apparatus;

a printed circuit board provided with a connector connected to an external system by a connection cable, said printed circuit board being grounded to said chassis;

a display controller provided in said printed circuit board, said display controller activating a display module, said display module displaying a picture;

a ground portion formed around said display controller; and a reinforcement connector provided on said printed circuit board, connected to said ground portion and supporting the ground of said printed circuit board, with said reinforcement connector being detachably connected to said connection cable.

12. The displaying apparatus according to claim 11, further comprising a second ground portion formed adjacent to said ground portion of said printed circuit board, said second ground portion being connected to said ground portion through a plurality of holes, said second ground portion being connected to said chassis through a secured conducting plate.

13. The displaying apparatus according to claim 11, further comprising a second reinforcement connector detachably connected to said connection cable, said second reinforcement connector supporting a ground of said printed circuit board.

14. The displaying apparatus according to claim 13, with said second reinforcement connector being detachably connected with said ground portion.

15. The displaying apparatus according to claim 13, with said reinforcement connector and said second reinforcement connector being on opposite sides of said connector detachably coupling with said connection cable, said connector receiving data signals from said external system to said printed circuit board.

16. The displaying apparatus according to claim 11, with said connector having a ground pin connected and formed with a ground contact accommodating said connector to be grounded through said ground portion around said controller.

17. A displaying apparatus, comprising:

a chassis surrounding edges of a display module, defining an external appearance of said displaying apparatus;

a printed circuit board provided with a connector connected to an external system by a connection cable, said printed circuit board being grounded to said chassis;

a display controller provided in said printed circuit board, said display controller activating a display module, said display module displaying a picture;

a ground portion formed around said display controller; and a reinforcement connector connected to said ground portion and supporting the ground of said printed circuit board, with said reinforcement connector being connected to said connection cable, with said reinforcement connector comprising:
- a connector body formed with a housing portion receiving said connection cable;
- a cover provided in said connector body, opening and dosing said housing portion, to fasten said connection cable in said housing portion; and
- a ground contact provided in said housing portion of said connector body, said ground contact connected to said connection cable and said ground portion of said printed circuit board.

18. A method, comprising:

lifting a cover of a reinforcement connector disposed adjacent to a connector of a liquid crystal display, said reinforcement connector being connected to a ground portion, said ground portion formed around a controller provided on a printed circuit board of said liquid crystal display, said controller driving said liquid crystal display to display variable video, said printed circuit board being grounded to a chassis of said liquid crystal display;

inserting a connection cable having a ground pin into an inside housing portion of said reinforcement connector below said cover, a portion of said connection cable being connected to said connector to transmit data signals from an external system;

moving said cover downward to close a housing portion of said reinforcement connector; and engaging a ground contact of said reinforcement connector with said ground pin of said connection cable, said ground contact being connected with said ground portion formed around said controller, said reinforcement connector supporting the ground of said printed circuit board.

19. The method according to claim 18, with said ground contact of said reinforcement connector being connected to a ground pin of said connector accommodating said connector to be grounded through said ground portion around said controller.

20. The method according to claim 19, further comprising a second reinforcement connector connected to said connection cable, said second reinforcement connector supporting a ground of said printed circuit board.

21. The method according to claim 20, with said reinforcement connector and said second reinforcement connector being on opposite sides of said connector coupling with said connection cable, said connector receiving data signals from said external system to said printed circuit board.

* * * * *